(12) United States Patent
Schrödl

(10) Patent No.: US 10,608,559 B2
(45) Date of Patent: Mar. 31, 2020

(54) ELECTRICAL MACHINE SYSTEM

(71) Applicant: TECHNISCHE UNIVERSITÄT WIEN, Vienna (AT)

(72) Inventor: Manfred Schrödl, Sieggraben (AT)

(73) Assignee: TECHNISCHE UNIVERISTÄT WEIN, Vienna (AT)

( * ) Notice: Subject to any disclaimer, the term of this patent is extended or adjusted under 35 U.S.C. 154(b) by 0 days.

(21) Appl. No.: 16/312,143

(22) PCT Filed: Jul. 4, 2017

(86) PCT No.: PCT/AT2017/060164
§ 371 (c)(1),
(2) Date: Dec. 20, 2018

(87) PCT Pub. No.: WO2018/006109
PCT Pub. Date: Jan. 11, 2018

(65) Prior Publication Data
US 2019/0238072 A1    Aug. 1, 2019

(30) Foreign Application Priority Data

Jul. 4, 2016  (AT) .............................. A 50594/2016

(51) Int. Cl.
*H02P 5/747*  (2006.01)
*H02K 16/02*  (2006.01)
(Continued)

(52) U.S. Cl.
CPC .............. *H02P 5/747* (2013.01); *H02K 7/116* (2013.01); *H02K 16/00* (2013.01); *H02K 16/02* (2013.01)

(58) Field of Classification Search
CPC .... H02K 7/14; H02K 7/10; H02P 1/54; H02P 5/00; H02P 5/46; H02P 1/00; H02P 1/04;
(Continued)

(56) References Cited

U.S. PATENT DOCUMENTS 2,782,328 A    2/1957  Lindberg
5,780,950 A    7/1998  Yang
(Continued)

FOREIGN PATENT DOCUMENTS

AT    508854 B1    3/2016
DE    2006386 C1   5/1987
(Continued)

OTHER PUBLICATIONS

Schrödl, M., "Sensorless Control of A.C. Machines," VDI Progress Report, vol. 21, No. 117, Available as Early as Jan. 1992, 76 pages.
ISA European Patent Office, International Search Report Issued in Application No. PCT/AT2017/060164, dated Oct. 6, 2017, WIPO, 6 pages.

*Primary Examiner* — Antony M Paul
(74) *Attorney, Agent, or Firm* — McCoy Russell LLP

(57) ABSTRACT

An electrical machine system with mechanically and electrically coupled sub-machines, which have common magnetic sections and common coils and are connected by way of mechanical transmission systems, wherein adjacent sub-machines have mutually opposed directions of rotation with equal rotational speeds, and the mechanical coupling is specified by a transmission functionality, which at the same time defines the transmission ratio of rotor speed to transmission output drive rotational speed.

14 Claims, 6 Drawing Sheets

(51) Int. Cl.
*H02K 16/00* (2006.01)
*H02K 7/116* (2006.01)

(58) Field of Classification Search
CPC ...... H02P 1/16; H02P 1/24; H02P 1/26; H02P 1/28; H02P 1/42; H02P 1/465; H02P 3/00; H02P 3/06; H02P 3/065; H02P 5/52; H02P 5/695; H02P 5/74; H02P 5/753; H02P 6/00; H02P 6/002; H02P 6/005; H02P 6/04; H02P 6/06; H02P 6/20; H02P 7/00; H02P 8/00; H02P 8/08; H02P 8/10; H02P 8/12; H02P 8/14; H02P 8/18; H02P 8/165; H02P 9/00; H02P 11/00; H02P 21/00; H02P 21/0035; H02P 23/00; H02P 23/0027; H02P 25/00; H02P 27/00; H02P 27/04; H02P 27/06; F16K 31/04
USPC ..... 318/8, 13, 15, 400.01, 400.02, 700, 701, 318/727, 779, 799, 800, 801, 430
See application file for complete search history.

(56) References Cited

U.S. PATENT DOCUMENTS 8,226,513 B2 * 7/2012 Abe ................ B60L 50/16
475/5
2015/0042182 A1 * 2/2015 Glover ................ H02K 1/14
310/46
2015/0308527 A1 10/2015 Nagel et al.

FOREIGN PATENT DOCUMENTS

| | | |
|---|---|---|
| DE | 4334590 A1 | 4/1995 |
| DE | 102009010162 A1 | 9/2010 |
| DE | 102012222949 A1 | 6/2014 |
| DE | 102013213847 A1 | 1/2015 |
| EP | 0678966 A1 | 10/1995 |
| EP | 0721248 A2 | 7/1996 |
| JP | S54101310 U | 7/1979 |
| WO | 2004047256 A1 | 6/2004 |
| WO | 2012164052 A2 | 12/2012 |
| WO | 2015007441 A2 | 1/2015 |

* cited by examiner

ELECTRICAL MACHINE SYSTEM

CROSS-REFERENCE TO RELATED APPLICATIONS

The present application is a U.S. National Phase of International Patent Application Serial No. PCT/AT2017/060164 entitled "ELECTRICAL MACHINE SYSTEM," filed on Jul. 4, 2017. International Patent Application Serial No. PCT/AT2017/060164 claims priority to Austrian Patent Application No. A 50594/2016, filed on Jul. 4, 2016. The entire contents of each of the above-cited applications are hereby incorporated by reference in their entirety for all purposes.

TECHNICAL FIELD

The invention concerns an electrical machine system with mechanically and electrically coupled sub-machines that have common magnetic sections and common coils and are connected by way of mechanical transmission systems, such as an electrical machine system with a preferably even number of mechanically and electrically coupled sub-machines. A machine system of this type is of known art from U.S. Pat. No. 5,780,950A and DE 10 2013 213 847 A1.

BACKGROUND

Electrical drives with transmission system stages are often designed with an electrical machine, such as a synchronous machine, an asynchronous machine, a reluctance machine and similar, which is excited either by permanent magnets or electrically, and to whose output shaft a single or multi-stage transmission system is mechanically connected.

For example, in DE 4 334 590 A1 an electric motor with a hollow shaft is disclosed, which is connected to a differential transmission system having a spur gear, one output shaft of which is led through the hollow shaft of the electric motor. However, a spur gear transmission system has the disadvantage that in each case only one pair of tooth flanks transmits the forces and the torque to the following shaft. A planetary gear with a plurality of planet gears would enable a distribution of the forces over a plurality of tooth flank pairs, but for a uniform distribution of the forces over the individual planet gears precision is required in its mechanical production, with the result that such a solution is expensive. In addition, the planet gears in planetary gears typically have two contact points on the tooth flanks at which transmission system losses are generated as a result of sliding movements.

From WO 2004/047256 A1 a generator with multiple outputs is of known art, wherein two generator units are mounted inside the housing around a main shaft.

Furthermore, DE 10 2013 213 847 A1 and the corresponding WO 2015/007441 A2 disclose arrangements of a plurality of electrical machines that are connected to a downstream transmission system. Here it is proposed to assign a plurality of pole pairs, e.g. four, to single pole rotors. The rotors are arranged radially offset relative to each other. A disadvantage here is that the disclosed downstream transmission system cannot implement opposite directions of rotation of adjacent rotors at the same rotational speed. A further disadvantage is that each rotor requires a full stator design, because no geometric simplifications can be introduced into the stator build to reduce the material required. In particular, the disclosed topologies cannot represent advantageously material-reduced three-phase alternating current topologies, such as four two-pole or four-pole rotors in a three-phase stator arrangement with a corresponding transmission functionality.

From EP 0721248 A2 an electrical drive device with a plurality of rotors excited by permanent magnets is of known art, with three stator poles assigned to each rotor. This drive device is intended for dry shavers, wherein the rotors rotate without any mutual mechanical connection, as is usual in shavers. This has the disadvantage that there is no preferred stage in the transmission system that increases the torque.

Another arrangement with a plurality of rotors and a common stator is shown in DE 10 2009 010 162 A1. Here the plurality of rotors is arranged in the form of a matrix, wherein all shafts rotate in the same direction, as a result of which a complicated stator geometry is required.

A similar solution is specified in U.S. Pat. No. 5,780,950 A, where a plurality of rotors similarly interacts with a common stator, wherein the stator coil ends are in each case directed towards another rotor. A disadvantage is that although all the rotors are mechanically connected to a stage of the transmission system, they rotate in the same direction and therefore have the characteristic of single-phase machines with fluctuating torques, which cause an uneven introduction of torque into the connecting transmission system. In particular, it is not possible to generate a three-phase alternating current arrangement that could feed in a uniform torque to each sub-rotor.

A further arrangement with a plurality of parallel rotors, and a magnetic circuit acting on a plurality of rotors, is specified in EP 0678966 A1. However, the geometry requires complex distributed coil systems, as a result of which a significantly complex stator build is required.

Finally, DE 2006 386 C1 also shows a multi-rotor arrangement that interacts with a rotating field of a common stator system. As a result of the matrix-like arrangement it is not possible to have an economical build of transmission system to connect the rotors, and by virtue of the target applications (centrifuges), this is also not the intention.

The object of the invention is to create an electrical machine system as described in the introduction, which, on the one hand, avoids the disadvantages cited above, and on the other hand, can work and be operated more economically by virtue of a new machine structure.

This object is achieved by the invention, which provides an electrical machine system in accordance with the accompanying claims.

The invention thus provides for a machine system with an arrangement of a plurality of sub electrical machines that are mechanically connected by way of a transmission system. Here a compact design of the machine system consisting of the sub electrical machines is made possible, as certain parts of the sub-machine can be omitted by virtue of the geometric arrangement, because the magnetic flux components of adjacent sub-machines compensate for each other element-by-element and thus magnetically active material can be saved, that is to say, eliminated. On the other hand, the mechanical coupling of the sub-machines can advantageously be embodied as a mechanical planetary gear (or mechanical planetary gear train or mechanical epicyclic gear train) with a desired transmission ratio, as a result of which components of the planetary gear, such as bearings, couplings and housing parts, can be saved, that is to say, utilised twice, compared to a discrete build of electrical machine and functionally separate planetary gear. Moreover, the planet gears connected to the sub-machines of the present machine system have only one contact on the tooth flank, as a result of which the losses can be significantly reduced compared to a normal planetary transmission system.

A further advantage is that the sub electrical machines transfer the sub-torques or sub-forces that they develop to a planet gear assigned to the sub-motor by a direct mechanical connection, irrespective of the mechanical manufacturing tolerances. Accordingly, there is no need to split a single shaft torque of the electrical machine by way of a gear onto planetary gears; rather the torque is split directly by means of the sub-machines. Thus, the power of each sub-machine can be apportioned into $1/n^{th}$ of the power of a single assigned electrical machine (where n=number of planet gears or sub-machines). In addition to the greatly simplified design, another noteworthy advantage ensues: since experience has shown that the peripheral speed of high rotational speed drives is predominantly limited to a few 100 m/s for strength reasons, significantly more electrical power can be installed in the same volume with the same limited peripheral speed of the sub-rotors. If, for example, a rotor is split into four sub-rotors with the same total rotor surface area, the sub-rotors then have half the diameter of the original rotor. Assuming the same specific thrust per unit surface area in the air gap, half the diameter, or half the periphery, of the original rotor signifies half the thrust per sub-rotor. Multiplying this by half the radius of the original rotor, each sub-rotor thus delivers a quarter of the original torque. In total, the splitting into surface area-neutral sub-rotors delivers the same torque, that is to say, the same power is generated with the same rotational speed of the sub-rotors as was originally possible. The same power output can therefore be achieved with the present system with half the peripheral speed, and a great advantage is thereby obtained in the mechanical implementation. Thus in principle, there is still a reserve enabling the rotational speed and thus the installed power output to be doubled with a restoration of the original peripheral speed. It is also advantageous that the transmission functionality that effects the mechanical coupling can be utilised as a transmission ratio from rotor speed to transmission system output drive speed.

Furthermore, it is beneficial that the coils of the multi-machine system can be connected to form a multi-phase alternating current winding system with any number of phases (or branches), preferably a three-phase alternating current winding system.

In a preferred embodiment, the sub-machines can be synchronous rotors with permanent magnet excitation, electrical excitation and/or reluctance characteristics. On the other hand, the sub-machines can also be asynchronous rotors in the form of a squirrel cage rotor and/or a slip ring rotor.

The activation of the coil system can advantageously be carried out by way of power electronic actuators in accordance with known activation methods for three-phase alternating current machines; furthermore, it is possible to determine an average electrical rotor position of the sub-machines by means of sensor-less methods, based on mathematical models, and a calculating unit. AT 508 854 B should be mentioned as an example. Mathematical models are also specified in Schrödl, M. "Sensorless Control of A.C. machines", VDI Progress Report, Series 21, No. 117 (VDI-Verlag Düsseldorf 1992).

The mechanical coupling of the sub-machines can also be such that the execution of a resulting linear movement is achieved in a manner known per se.

For ease of adjustment, it is also advantageous if the average angular positions of the sub-machines rotating in different directions can be altered mechanically relative to each other during operation.

The machine system can have a shaft that carries one or a plurality of transmission system elements, wherein the transmission system element(s) mechanically couple(s) the sub-machines, wherein the shaft is mechanically connected to a differential transmission system; here the shaft is preferably embodied as a hollow shaft to save space.

BRIEF DESCRIPTION OF THE FIGURES

In what follows the invention will be further explained by means of preferred examples of embodiment shown in the figures. In the individual figures.

In what follows, a two-branch (or phase) and a three-branch (or phase) structure, in each case based on four sub-machines 1, 2, 3, 4, will be converted into an advantageously constructed two-branch or three-branch planetary motor.

DETAILED DESCRIPTION

Figure 1:
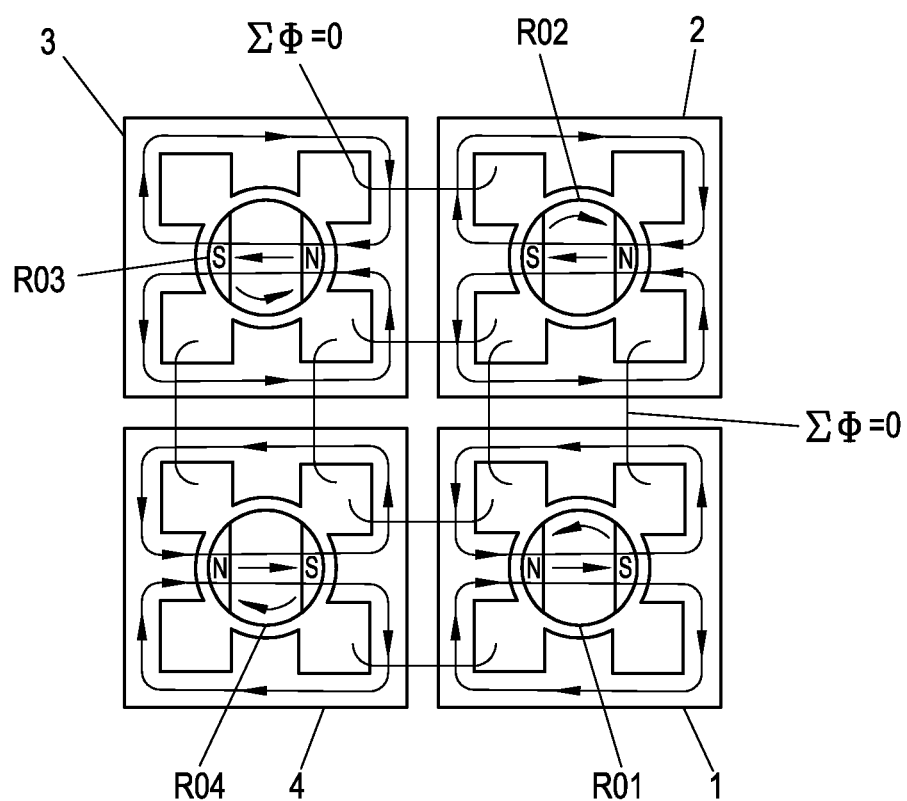
FIG. 1 shows schematically a machine system with four sub-machines.

FIG. 1 illustrates the four sub-machines 1, 2, 3, 4, with, for example, rotors RO1 to RO4 excited by permanent magnets. The rotors RO1 to RO4 are e.g. magnetised according to FIG. 1 such that a horizontal magnetisation direction N→S arises in each case, wherein the upper sub-motors 1, 2 have a magnetisation direction N-S from right to left and the lower sub-motors 3, 4 have a magnetisation direction from left to right (as shown in FIG. 1). The field patterns are symbolically recorded in a simplified manner with arrows and lines.

Figure 2:
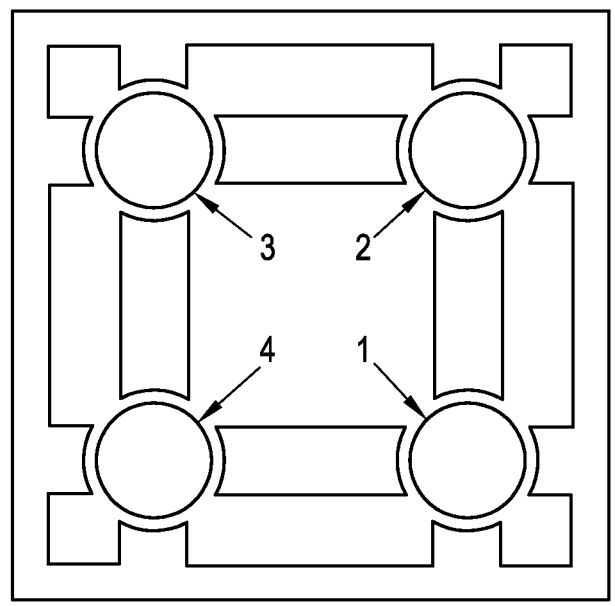
FIG. 2 shows a schematic structure, simplified compared to FIG. 1, of such a machine system with four sub-machines.
Figure 3:
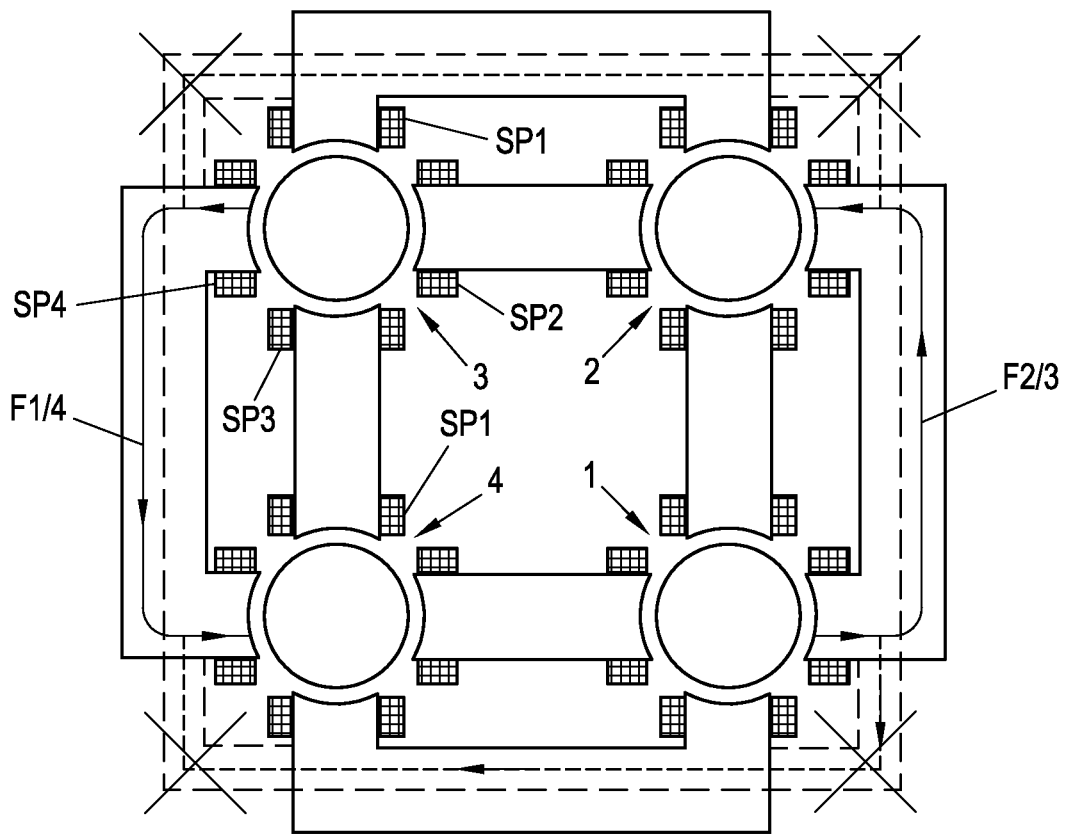
FIG. 3 shows a machine system, further simplified in design compared to FIG. 1, in a schematic representation.

If it is now required that during a 90°-rotation of, for example, the lower right-hand rotor RO1, the other rotors RO2, RO3, RO4 rotate in a mathematically positive direction, such that a field pattern is created that can be generated by rotating the entire pattern of FIG. 1 through 90° relative to the original field pattern, this is possible if diagonally opposite rotors, e.g. RO1 and RO3, rotate in the same direction, and the other two rotors, e.g. RO2 and RO4, rotate at the same angular speed in the opposite direction. This principle can be generalised, if a matrix of 2.n (where n=1, 2, . . . ) sub-machines 1, 2, 3, 4 . . . is constructed in which adjacent machines always rotate in the opposite direction with the same angular velocity. This design rule makes it possible to simplify the structure: if, for example, the four sub-motors 1 to 4 are now brought into contact, the adjacent fluxes in adjacent sections of the sub-motors 1 to 4 in FIG. 1 cancel each other out—in FIG. 1 this is indicated by ΣΦ=0. Thus the corresponding magnetic parts can be saved, that is to say, eliminated, whereby a reduction of the active material required in the magnetic circuit is achieved, cf. also FIG. 2, which shows a simplified schematic in principle, without any representation of systems and field lines. It is now possible to rearrange the outer return regions, without changing the air gap fields of the four sub-machines 1 to 4, whereby the arrangement according to FIG. 3 ensues. The dashed areas and field lines of the "old" structure (according to FIG. 1) in FIG. 3 are "redirected", whereby the new paths of the field lines (continuous lines in FIG. 3)—e.g. F2/3 and F1/4—are created without changing the field patterns in the respective air gap regions. Furthermore the coil systems of the four sub-machines 1 to 4 are recorded in FIG. 3 (four coils SP1 to SP4 per sub-machine 1, 2, 3 or 4, i.e. a total of 16 coils).

The new paths of the field lines do not alter the flux linkages of the coils. It is now possible to combine two coils of adjacent sub-machines, through which the same flux flows, into one coil in each case, e.g. the coils SP1 and SP3 of sub-machines 3 and 4 in FIG. 3, without altering the functionality of the arrangement. This advantageously allows the coil system of the four sub-machines 1 to 4 to be reduced from 16 coils to a total of 8, thus achieving a much simpler structure compared to the original structure.

Alternatively, an analogous structure with a three-branch coil system can be derived instead of the two-branch structure shown in FIG. 3. In order to do this, the structure of FIG. 1 is altered from the two-branch structure to a three-branch initial structure, consisting once again of four sub-machines 1 to 4, see FIGS. 6A and 6B; each of the sub-machines 1 to 4 in FIGS. 6A and 6B carries three coils, in total the initial structure in FIG. 6 therefore carries 12 coils. For better illustration it is again assumed that two-pole rotors are excited by permanent magnets. However, other rotors are also conceivable, for example with a pure reluctance characteristics, or with electrical excitation, etc.

Figure 6A:
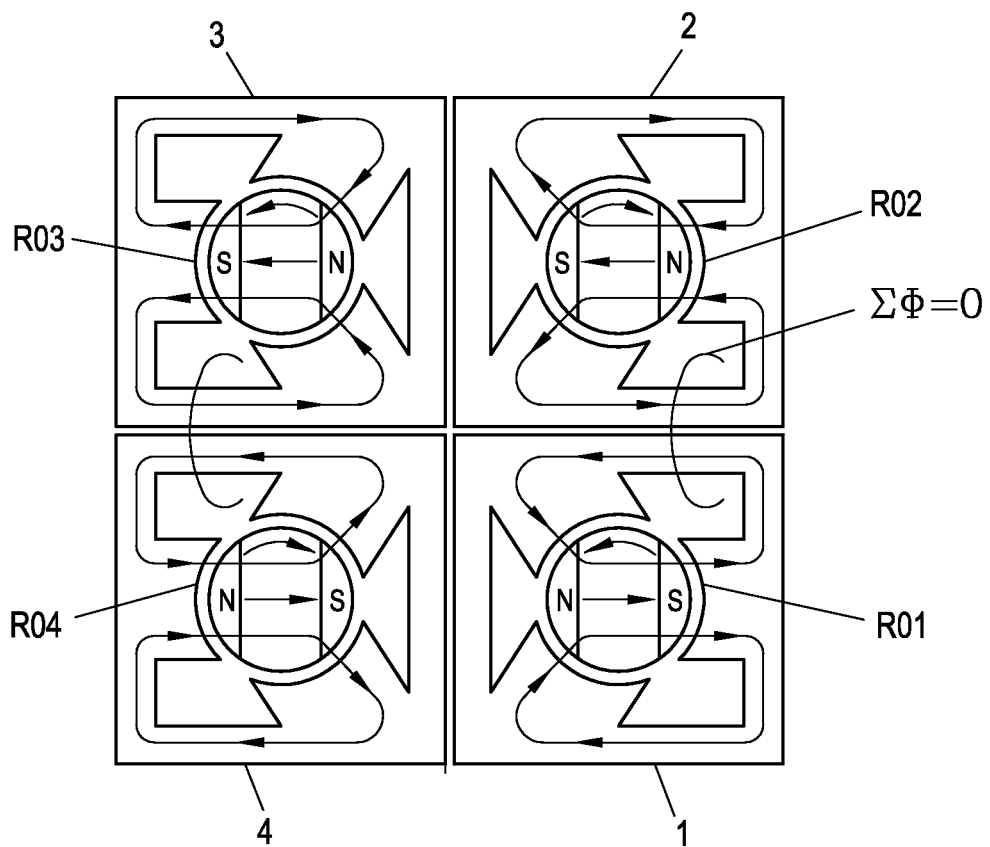
FIG. 6A shows a schematic of a machine system with four sub-machines, wherein the rotors of these machines are aligned such that they all have a horizontal magnetic axis.

In FIG. 6A the rotors RO1 to RO4 of the sub-machines 1 to 4 are aligned such that they all have a horizontal magnetic axis N→S. A schematic field pattern according to FIG. 6A arises, wherein, due to the particular arrangement of the four sub-machines 1 to 4, some sub regions once again do not carry a flux, as a result of mutual compensation (as indicated in FIG. 6A in the case of rotors RO1 and RO2, where ΣΦ=0). These parts are subsequently omitted.

Figure 6B:
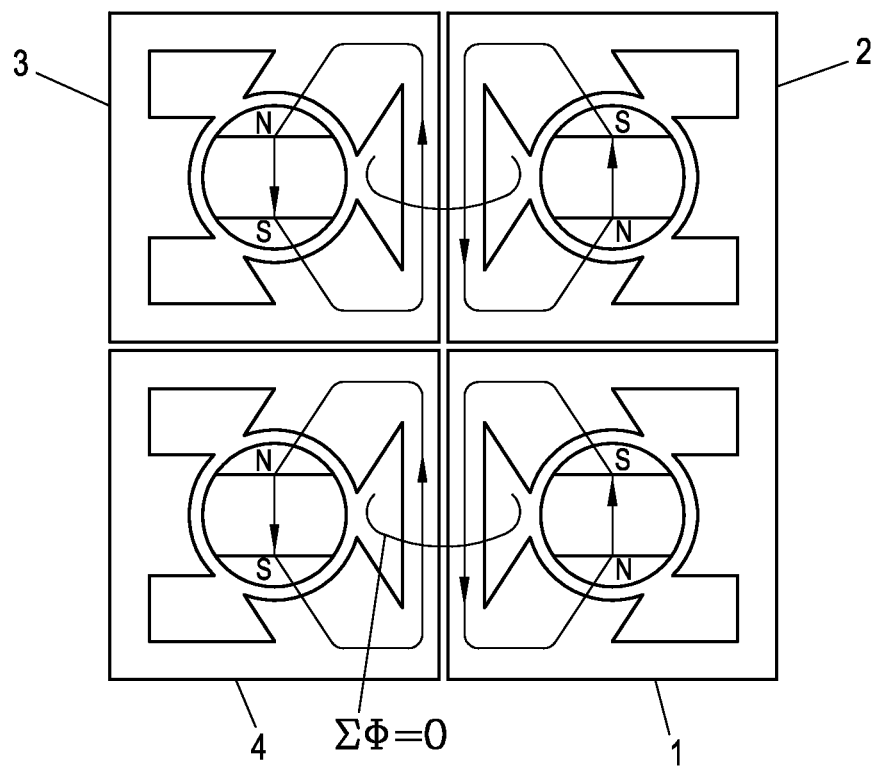
FIG. 6B shows a comparable schematic of a machine system, in which, however, a vertical magnetic axis arises in each of the four sub-machines.

In FIG. 6B, a vertical magnetic axis N-S arises in each of the four sub-machines 1 to 4. Here this is achieved by the rotation through +90° or −90° of adjacent machines, e.g. 1/2, 2/3, 3/4 or 4/1, which are rotating in opposite directions, but at the same absolute rotational speed.

In this magnetic field configuration, parts of the machine again ensue in which the flux in adjacent regions is cancelled out (i.e. ΣΦ=0) and the corresponding electromagnetic parts can thus be omitted.

Any magnetisation along the possible coupled rotations of the sub-machines 1 to 4 can be generated by a linear combination of sub-fields, as in FIGS. 6A and 6B.

Figure 7:
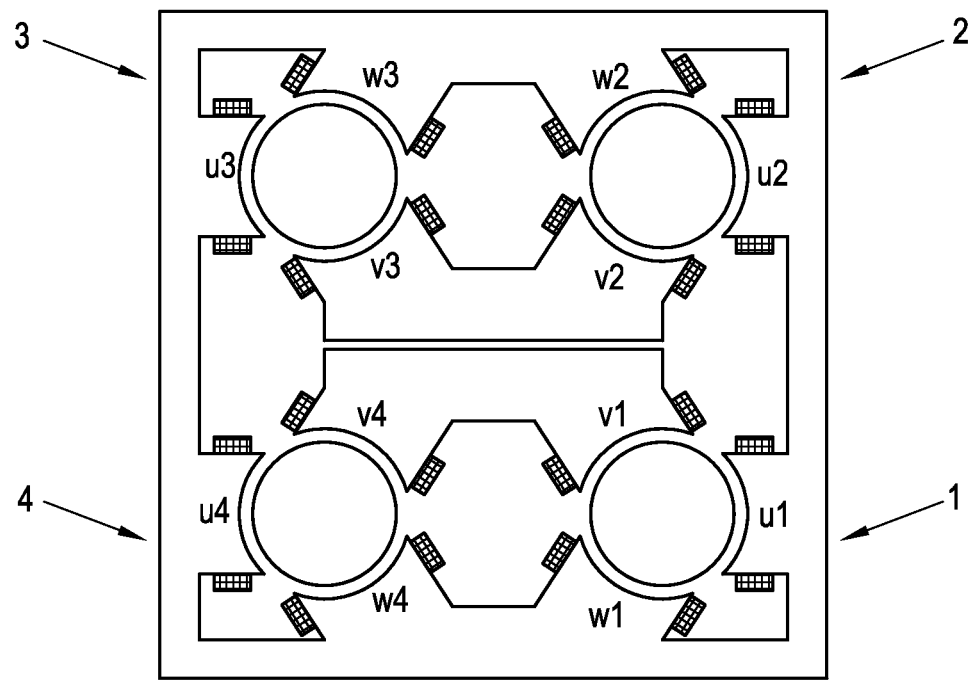
FIG. 7 shows another schematic of a machine system with four sub-machines, with a modified coil arrangement.

If the sub-motors 1 to 4 are now brought into appropriate contact and the magnetically unnecessary parts are omitted, the simplified structure in FIG. 7 ensues. The original coils (branch u with coils u1 to u4, and in an analogous manner, branches v and w) are still symbolically drawn in. By a rearrangement of flux management parts, the further simplified structure in FIG. 8 can be obtained, for example, without altering the air gap fields of the sub-motors 1 to 4. The coils have been displaced along the magnetic paths without flux linkage alteration, so that in each case two coils are located next to each other (e.g. u1,2 or w1,2 to w2,3 etc. in FIG. 8). The adjacent sub-coils can now be combined to form a single coil, as a result of which the number of coils is halved from 12 to 6.

Figure 8:
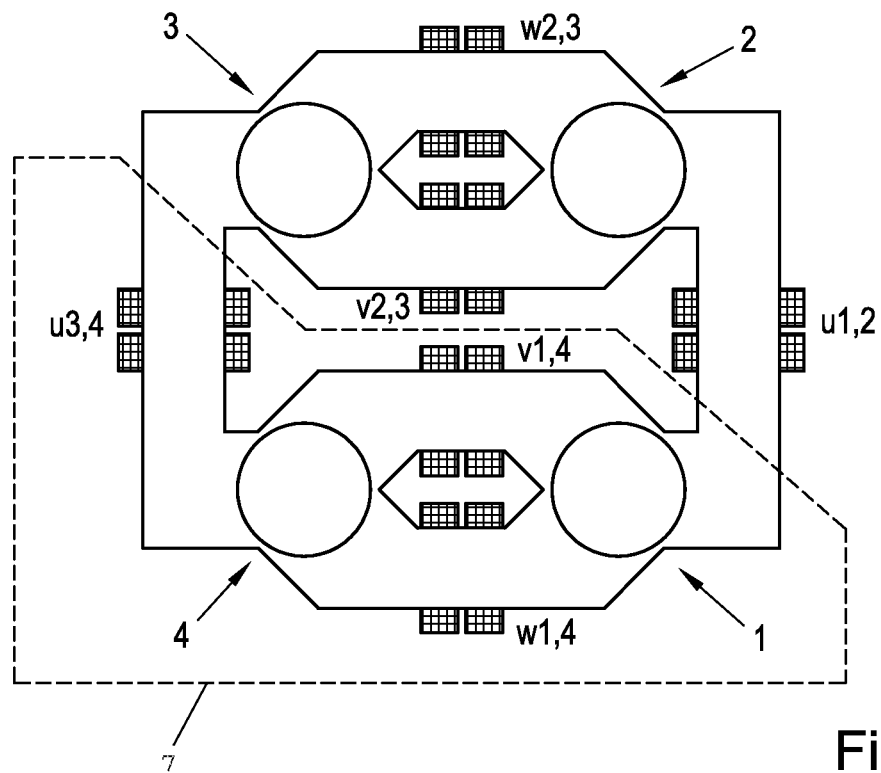
FIG. 8 shows a further modified schematic arrangement of such a machine system with four sub-motors, wherein two coils are now located next to each other in each case.

The three-branch arrangement in FIG. 8 has the advantage that conventional three-branch inverters can be used for purposes of actuation. The two coils that belong to one branch, e.g. u1 to u4 etc., can be connected either in series or in parallel, as they always carry the same flux linkages. However, they can also be activated with separate inverters (not shown), for example to enable redundancy or increased power output. Advantageously the inverters are controlled in accordance with known control methods for three-phase alternating current machines, such as field-oriented control, wherein here a more detailed description can be omitted, since this is of known art per se. Rotary encoders are often not required if so-called "sensor-less" methods, such as the "INFORM®" method or the EMF method, are deployed. For the inverter, the "multi-motor system" then behaves as a single electrical machine in terms of terminal behaviour.

Figure 9:
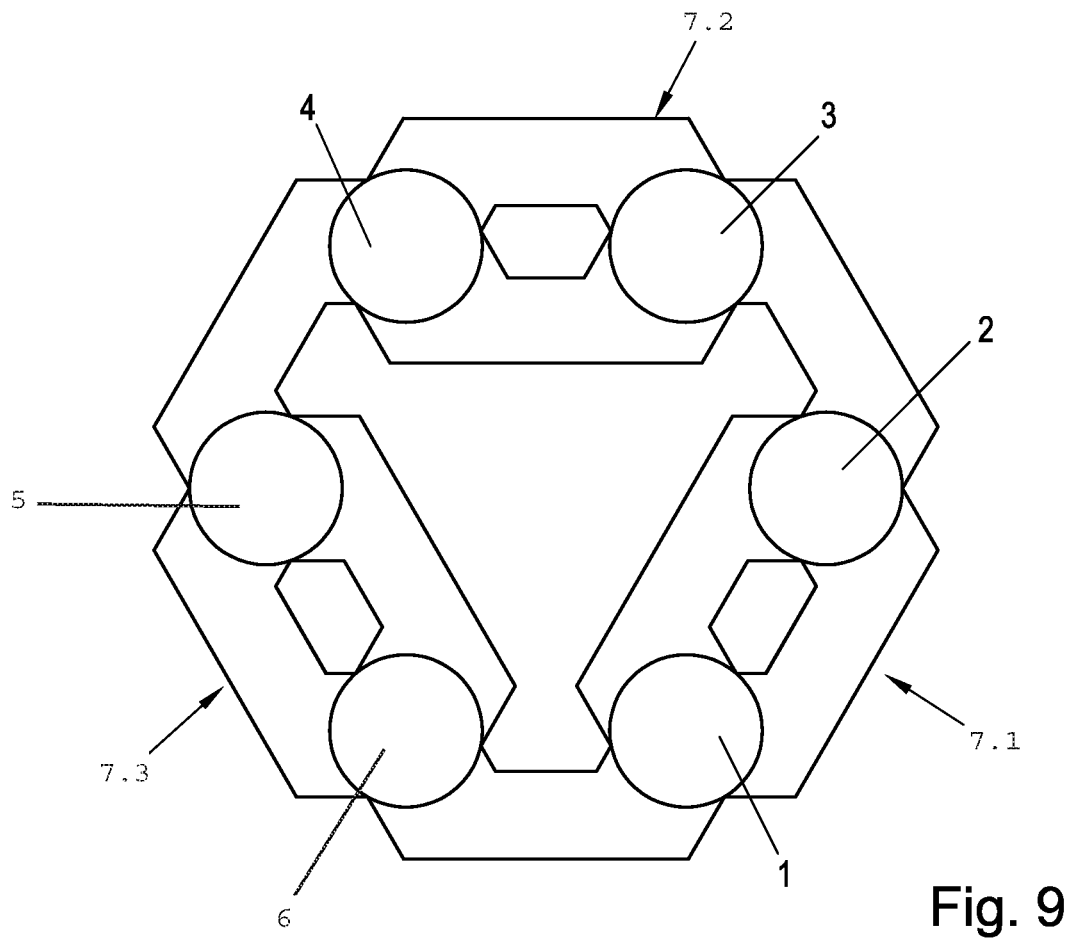
FIG. 9 shows a schematic similar to that of FIG. 8, but with three coil systems instead of the two coil systems shown in FIG. 8.

FIG. 8 shows a dashed sub-structure 7, which is a basic element for further arrangements with 2m sub-motors, where m=1, 2, 3, 4 . . . . As an example, FIG. 9 shows an arrangement with m=3, i.e. three sub-structures 7.1, 7.2 and 7.3, and six sub-motors, e.g. 1 to 6 (coils and rotors are not shown in the interests of simplicity). This enables, for example, a ring motor with a number of planet gears or a linear drive L (cf. FIG. 10) to be implemented. In the example of a linear drive L with four sub-motors 1, 2, 3, 4 in FIG. 10 a toothed rack ZS with teeth on both sides represents a mechanical coupling of the sub-motors 1 to 4.

The mechanical coupling of the two structures (two-branch or three-branch) can take place in the same way with positive form-fit connections, preferably gears (but alternatively toothed belts, chains, etc.). It should be noted that for rotors in which the function is independent of the rotor angle, such as asynchronous machines, a frictional form of connection is also permissible.

Figure 4:
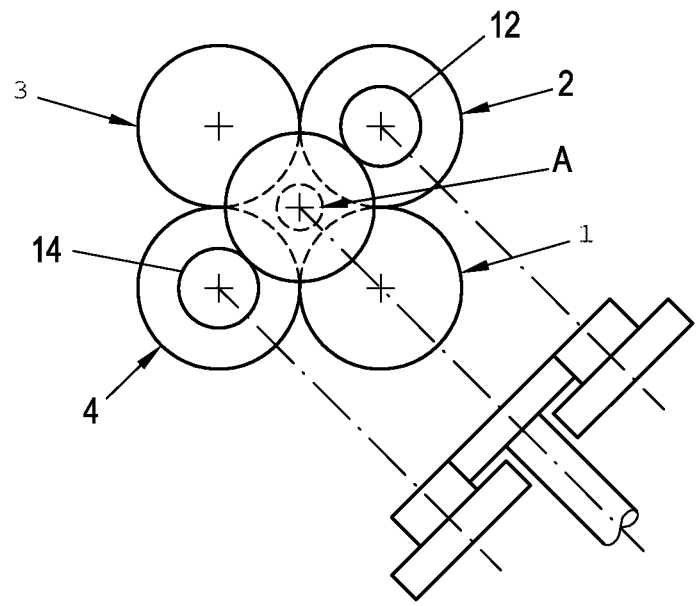
FIG. 4 an example of a mechanical coupling, here exclusively with externally toothed gears.

FIG. 4 shows an example exclusively with externally toothed gears 12, 14. The two gears 12 and 14 connected to sub-machines 2 and 4 effect an automatic reversal of the direction of rotation of adjacent sub-machines. Each small gear 12, 14 (in FIG. 4 the gears are embodied as double gears) can be used to implement a transmission ratio onto the output drive shaft A (which in FIG. 4 is located in the centre of the arrangement).

Figure 5:
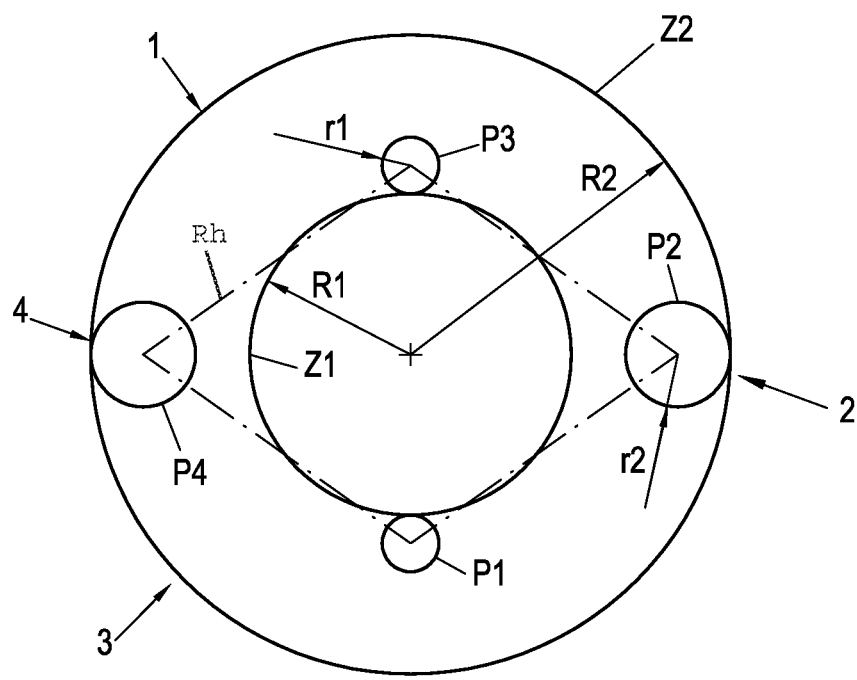
FIG. 5 shows a modified planetary gear, with reversal of the direction of rotation relative to the adjacent associated sub-machine.

In FIG. 5, the reversal of the direction of rotation of adjacent sub-machines 1 to 4 is implemented in each case by an inner and an outer gear P2, P4 or P1, P3, respectively, wherein one group of rotational direction has a central gear Z1 with external teeth, and the other group of rotational direction has a central gear Z2 with internal teeth, wherein the transmission ratios of the two groups are the same. If the two sub-transmission systems are implemented in the same plane, the group that engages with the central gear Z2 with internal teeth is displaced outwards such that no collision of the gears occurs.

According to the exemplary arrangements in FIG. 3 or FIG. 7, the axes of the sub-machines 1 to 4 are then no longer located at the corners of a square, but instead preferably at the corners of a rhombus Rh (see FIG. 5), wherein the axes on the short diagonal of the rhombus engage via the planet gears P1, P3 with the inner gear Z1 with external teeth, and the axes on the long diagonal engage with the outer gear Z2 with internal teeth.

FIG. 5 also shows as an example a transmission ratio of r1:R1=r2:R2=1:6. In principle a reversal of the design is also possible, i.e. the two rows of teeth of the central pair of gears are located on the inside and outside of a circular ring ("a double-sided toothed rack bent into a circular ring").

Figure 10:
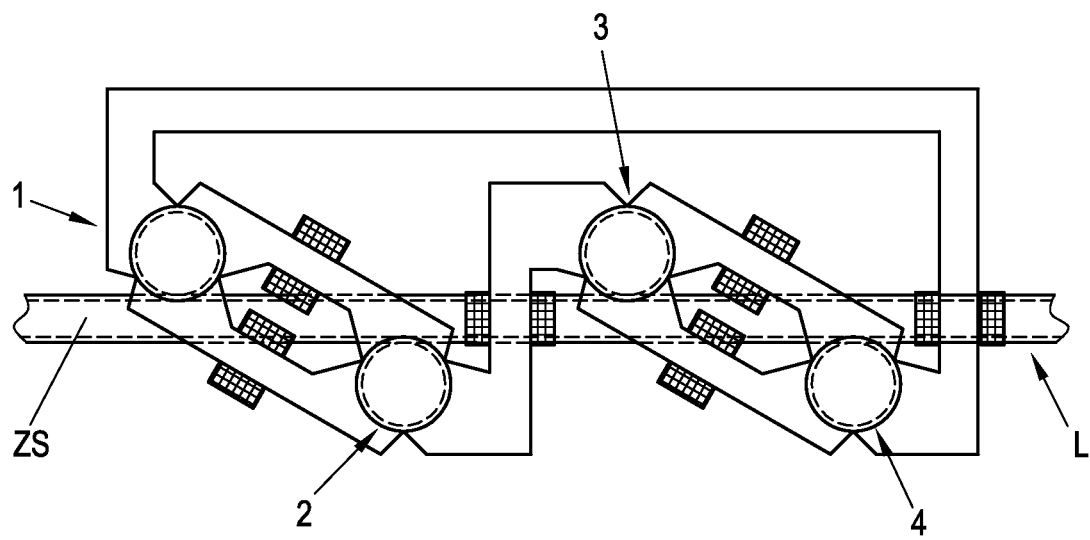
FIG. 10 shows, in a further development of the FIG. 8 system, a schematic of a linear drive.

If the radius of the circular ring is then set to infinity (i.e. a straight rack ZS), a linear drive ensues, see also FIG. 10.

If the gears of the two groups of rotational direction are arranged in different planes (axially offset, if necessary possibly also on the other side of the sub-machines), the axes of the sub-machines 1 to 4 can still be arranged on a square (in the case of four sub-machines 1 to 4), or more generally on a polygon with n equal sides.

In a particular configuration the relative angle between the two groups of rotational direction can be altered by means of a suitable mechanism. For example, the fixed gears Z1 and Z2 of FIG. 5 can have helical gearing (known per se), and can be moved axially by a mechanism that enables an axial displacement of the gears Z1 and Z2 with respect to the engaging planet gears. As a result of the axial displacement and the helical gearing, the relative angle between the groups of rotational direction is rotated. In this manner the two groups of rotational direction are rotated in relation to each other, and in the case of rotors excited by permanent magnets, for example, a geometrically induced field weakening can be implemented without a standard field weakening stator current component. This allows, for example, a permanent magnet synchronous drive with any voltage during the rotation, that is to say, even with a voltage of zero, to be achieved. With this axial movement option, other functions, such as a parking brake function, a "zero clamping voltage" safety function, etc., can also be additionally implemented.

Figure 11:
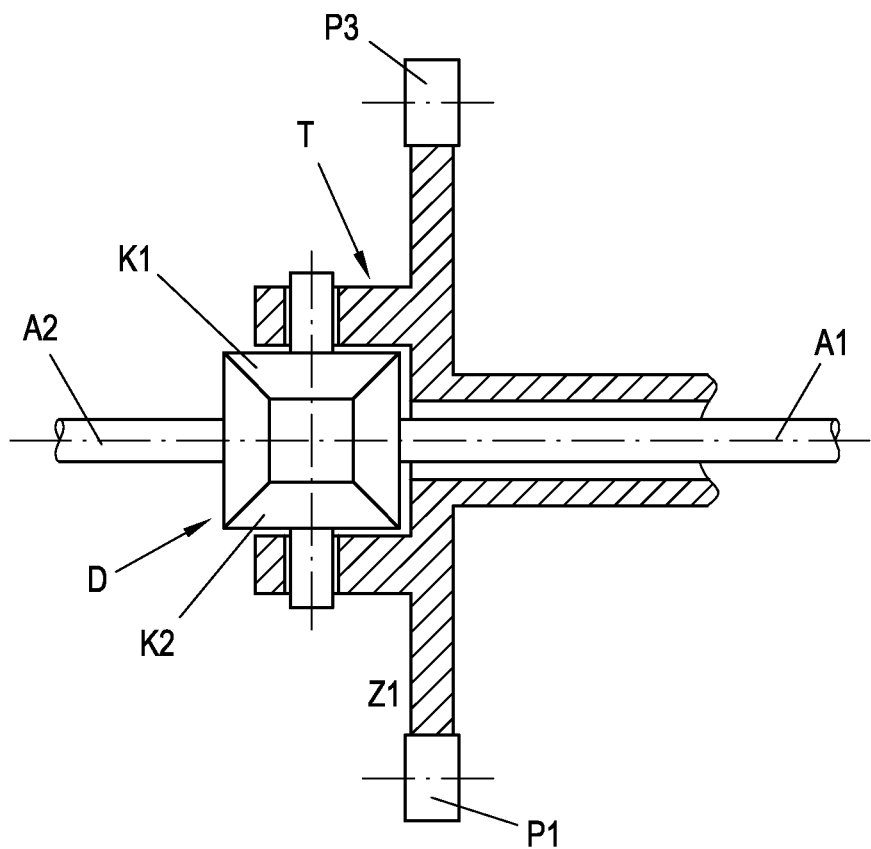
FIG. 11 shows schematically a differential transmission system that can be used with advantage in the present context.

In a further configuration, FIG. 11, one of the gears Z1 or Z2 or the mechanically fixed pair of gears Z1/Z2 is used as a rotating carrier of a differential transmission system D, in which two bevel gears K1, K2 of the differential transmission system D are preferably mounted, which are not connected to the output drive shafts A1, A2. One of the two output drive shafts, the shaft A1, of the differential transmission system D is led through the central shaft of the planetary motor, which is designed as a hollow shaft and is connected to the gears Z1 and Z2. The second output drive shaft A2 exits the drive unit coaxially with the first output drive shaft A1 in the opposite direction. By this means a very compact, space-saving and cost-effective drive unit can be implemented, e.g. for electric vehicles.

The invention claimed is:

1. A machine system with an even number of mechanically and electrically coupled sub-machines, which have common magnetic sections and common coils, and are connected by way of mechanical transmission systems, wherein adjacent sub-machines have mutually opposed directions of rotation with equal rotational speeds, wherein that the reversal of the direction of rotation of adjacent sub-machines is implemented by an inner and an outer gear per machine pair of adjacent sub-machines with opposed directions of rotation, wherein the sub-machines of a group of rotational direction exclusively have inner or outer gears, wherein one group of rotational direction has a central gear with external teeth, with which the outer gears engage, and the other group of rotational direction has a central gear with internal teeth, with which the inner gears engage, wherein transmission ratios of the two groups are the same, and in that the coils are connected to a multi-phase alternating current winding system of any number of phases.

2. The machine system according to claim 1, wherein the sub-machines are synchronously running rotors with permanent magnet excitation, electrical excitation and/or reluctance characteristics.

3. The machine system according to claim 2, wherein a shaft which carries a transmission system element or transmission system elements, which mechanically couples or couple the sub-machines, is mechanically connected to a differential transmission system.

4. The machine system according to claim 3, wherein the shaft is embodied as a hollow shaft.

5. The machine system according to claim 1, wherein the sub-machines are asynchronously running rotors in the form of a squirrel cage rotor and/or a slip ring rotor.

6. The machine system according to claim 1, wherein the coils are actuated by power electronic actuators in accordance with an actuation method for three-phase alternating current machines.

7. The machine system according to claim 1, wherein a calculating unit is provided for determining an average electrical rotor position of the sub-machines by way of sensor-less methods on the basis of mathematical models.

8. The machine system according to claim 1, wherein average angular positions of at least two sub-machines rotating in different directions are mechanically alterable relative to one another during operation.

9. The machine system according to claim 8, wherein the average electrical rotor angular positions of all sub-machines are alterable relative to one another during operation.

10. The machine system according to claim 1, wherein a shaft which carries a transmission system element or transmission system elements, which mechanically couples or couple the sub-machines, is mechanically connected to a differential transmission system.

11. The machine system according to claim 10, wherein the shaft is embodied as a hollow shaft.

12. The machine system according to claim 1, wherein mean angular positions of at least two sub-machines rotating in different directions are mechanically alterable relative to one another during operation.

13. The machine system according to claim 12, wherein the mean angular positions of all sub-machines are mechanically alterable relative to one another during operation.

14. The machine system according to claim 1, wherein the multi-phase alternating current winding system is a three-phase winding system.

* * * * *